United States Patent
Hariharan et al.

(10) Patent No.: US 9,639,511 B2
(45) Date of Patent: May 2, 2017

(54) SYSTEMS AND METHODS FOR EDITING A FILE IN A NON-NATIVE APPLICATION USING AN APPLICATION ENGINE

(71) Applicant: Google Inc., Mountain View, CA (US)

(72) Inventors: Nagarajan Hariharan, Edison, NJ (US); Jeffrey Michael Kurtz, Brooklyn, NY (US); Ryan Tabone, Mountain View, CA (US); Sarah Cooper, New York, NY (US); Dominic Marin Espinosa, New York, NY (US); Jonathan Rochelle, Chester, NJ (US); David Halpin, Cape Coral, FL (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 14/552,384

(22) Filed: Nov. 24, 2014

(65) Prior Publication Data

US 2016/0147722 A1   May 26, 2016

(51) Int. Cl.
*G06F 17/22* (2006.01)
*G06F 17/24* (2006.01)
*G06F 17/30* (2006.01)

(52) U.S. Cl.
CPC ............ *G06F 17/24* (2013.01); *G06F 17/227* (2013.01); *G06F 17/2247* (2013.01); *G06F 17/30557* (2013.01)

(58) Field of Classification Search
None
See application file for complete search history.

(56) References Cited

U.S. PATENT DOCUMENTS

| | | | | |
|---|---|---|---|---|
| 7,752,600 B2 * | 7/2010 | Laborczfalvi | ....... | G06F 9/44505 717/120 |
| 7,788,290 B2 * | 8/2010 | Little | ................ | G06F 17/30569 707/803 |
| 8,099,445 B1 * | 1/2012 | Masinter | ................. | G06F 9/445 707/791 |
| 8,341,554 B1 * | 12/2012 | Benson | .................... | G06F 8/51 715/209 |
| 8,751,493 B2 * | 6/2014 | Procopio | ........... | G06F 17/30126 707/736 |
| 9,071,561 B2 * | 6/2015 | Williams | ............. | G06Q 10/107 |

(Continued)

FOREIGN PATENT DOCUMENTS

| | | |
|---|---|---|
| WO | WO 2011/130307 | 10/2011 |
| WO | WO 2012/128950 | 9/2012 |

OTHER PUBLICATIONS

Darbyshire et al., "Getting Started with Google Apps," Copyright 2010, ISBN: 978-1-4302-2665-9, pp. 109-137.

(Continued)

*Primary Examiner* — Maikhanh Nguyen
(74) *Attorney, Agent, or Firm* — Ropes & Gray LLP

(57) ABSTRACT

Systems and methods are disclosed herein for editing documents with non-native applications using an application engine. A request to open a document file using a non-native application is received from a user. An engine of the non-native application is selected, the engine being configured to edit the format of the file. Modifications to the document are received by the non-native application engine, and the document is saved to the file using the format of the file, without converting the document to a different format.

20 Claims, 12 Drawing Sheets

(56) References Cited

U.S. PATENT DOCUMENTS

| | | |
|---|---|---|
| 2005/0187756 A1 | 8/2005 | Montgomery et al. |
| 2006/0070029 A1* | 3/2006 | Laborczfalvi ....... G06F 9/44505 |
| | | 717/120 |
| 2010/0017461 A1* | 1/2010 | Kokkevis ............ G06F 9/44526 |
| | | 709/203 |
| 2011/0252312 A1* | 10/2011 | Lemonik ............... G06F 17/248 |
| | | 715/255 |
| 2012/0110436 A1 | 5/2012 | Adler et al. |
| 2013/0104031 A1* | 4/2013 | Chen ..................... G06F 17/218 |
| | | 715/234 |
| 2013/0111336 A1* | 5/2013 | Dorman ................ G06F 9/4843 |
| | | 715/255 |
| 2013/0198600 A1 | 8/2013 | Lockhart et al. |
| 2013/0282755 A1* | 10/2013 | Procopio ........... G06F 17/30126 |
| | | 707/770 |
| 2014/0052800 A1* | 2/2014 | Williams ............. G06Q 10/107 |
| | | 709/206 |
| 2014/0344247 A1 | 11/2014 | Procopio et al. |

OTHER PUBLICATIONS

Miller, "Cloud Computing: Web-Based Applications That Change the Way you Work and Collaborate Online, Chapter 11: Collaborating on Word Processing," ISBN: 0-7897-3803-1, dated Aug. 11, 2008, 18 pages.

International Search Report and Written Opinion for PCT Application No. PCT/US2015/061986, filed Nov. 20, 2015, 15 pages.

\* cited by examiner

SYSTEMS AND METHODS FOR EDITING A FILE IN A NON-NATIVE APPLICATION USING AN APPLICATION ENGINE

FIELD OF THE INVENTION

In general, this disclosure relates to accessing a file using an application that is different from the application used to create the file.

BACKGROUND

An application generally has its own associated native file format which specifies encoding of the features that the application supports. Applications will typically load only those features which are supported by the application's native format. Any features which are unsupported by the application's native format will encounter problems loading or will load incorrectly. Thus, using a software application to edit and save a file that was created with a different software application, often causes loss of data when the file and file format may have features that are not supported by the application. One way this can be handled is that the application will convert the file to another format—its native format. When the application saves the file, only the loaded features are saved, and thus any unsupported features are not saved. This loss of data can cause problems when a file is edited by multiple users, or by one user with multiple applications.

SUMMARY

Accordingly, systems and methods are described herein for providing file access and use using a non-native application having a plurality of engines. In certain aspects, the systems and methods described herein relate to editing a document in a native format using a non-native application. A processor that is running a first application receives a request from a user to open a file created using a second application in a first format. The processor may determine the first format of the file. The processor may select an engine from a plurality of engines associated with the first application, wherein the selected engine is configured to edit the first format. The processor may open the file using the selected engine in the first application without converting the format of the file to a second format associated with the first application. The processor may cause the selected engine in the first application to render the contents of the file for display on a user device to the user. The processor may cause the selected engine in the first application to process an edit to the file in the first format. The processor may then save, to a database, the edited file using the first application in the first format. In some implementations, the processor may present to the user a user interface comprising feature editing tools of the selected engine.

In some implementations, the processor may determine that the selected engine is configured to edit a feature of the file. The processor may then cause the selected engine in the first application to render the feature for display on a user device to the user. The processor may then cause the selected engine in the first application to process an edit to the rendered feature in the first format. The processor may then save, to a database, the edited feature to the file using the first application in the first format.

In some implementations, the processor may determine that the selected engine is not configured to edit a first feature of the file. The processor may then cause the selected engine in the first application to render the first feature for display on a user device to the user. The processor may then prevent modification of the first feature by the user. The processor may then determine that the selected engine is configured to edit a second feature of the file. The processor may then cause the selected engine in the first application to render the second feature for display on a user device to the user. The processor may then cause the selected engine in the first application to process an edit to the second feature in the first format. The processor may then save, to the database, the edited second feature to the file using the first application in the first format.

In some implementations, the processor may cause the selected engine to place data corresponding to the first feature into a node of a document object model and associate with the node the characteristic that the selected engine is not configured to edit the first feature. The processor may then save, to the database, the placed data to the file using the first application in the first format.

In some implementations, the processor may determine that the selected engine is not configured to render a feature of the file. The processor may then place data corresponding to the feature into a node of the document object model and associate with the node the characteristic that the selected engine is not configured to render the first feature. The processor may then save, to the database, the placed data to the file using the first application in the first format.

In some implementations, the file may be stored on a server remote from the user. In some implementations, the processor may, to select an engine, locate the first format in a database, determine that an engine is associated with the first format, and select the associated engine. In some implementations, the processor may, to determine the first format of the file, read a portion of the file, extract a file type from the read portion, and determine the first format of the file based on the extracted file type.

In some implementations, the processor may determine that a plurality of engines are associated with the file format. The processor may then present a plurality of names to the user, each name corresponding to one of the plurality of engines. The processor may then receive, from the user, a selected name from the plurality of names. The processor may then select the engine associated with the selected name. In some implementations, the processor may save the file in a third format.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the disclosure, certain illustrative implementations will now be described, including a system for editing files in a native format. In particular, a system is described in which files can be edited in a native format with a non-native application, or an application other than the application which created the file. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

Figure 1:
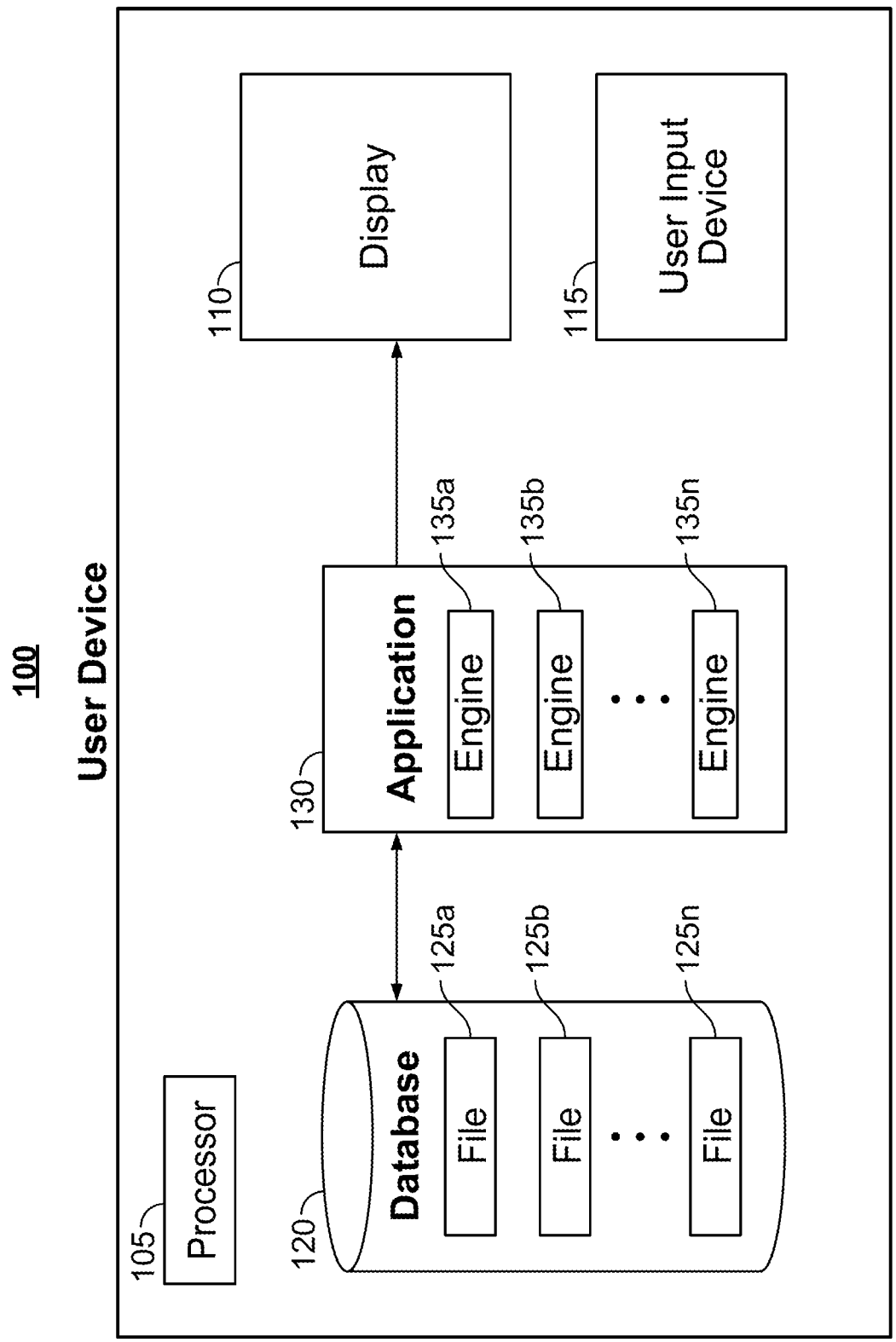
FIG. 1 is a block diagram of a user device, according to an illustrative implementation.

FIG. 1 illustrates a user device 100 which may be used to edit a document in a native format. The user device 100 may include a processor 105, a display 110, a user input device 115, and one or more databases 120 containing one or more files 125, for example files 125a-125n. The user device 100 may include one or more applications 130, for example, applications 130a-130n. A processor may include one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Each user device 100 may include a device such as a personal computer, a laptop computer, a tablet, a smart phone, a personal digital assistant, or any other suitable type of computer or communication device.

An example file 125a may have a file format which determines the manner in which the file's information is encoded into bits in memory, and further, the manner in which that information is decoded from memory and presented to a user. Generally speaking, a file has a file format that is based on the application that was used to create the file, such as the application's native file format. File formats may be simple or complex. A simple file format is the American Standard Code for Information Interchange (ASCII), which encodes plain text and some simple characters. An example of a complex file is the format used to encode information in a word processing document. A word processing format may, for example, specify the encoding method for fonts, font sizes, font styles, font colors, tabs, paragraphs, bulleted lists, numbered lists, tables, text wrapping, text alignment, text highlighting, line spacing, page breaks, page size, margins, columns, headers, footers, footnotes, endnotes, cross-references, tables of contents, indices, and embedded content such as images and video. A spreadsheet format is also complex and may specify the encoding method for cell contents, formula operations, fonts, font sizes, font styles, font colors, cell borders, cell colors, and charts. A presentation format is also complex and may specify the encoding method for fonts, font sizes, font styles, font colors, text boxes, shapes, slide size, position and arrangement of items within a slide, slide ordering, slide transitions, animations, and embedded content such as images, video, and spreadsheets. File formats may incorporate other formats. For example, word processing, spreadsheet, and presentation formats may all incorporate the ASCII format to encode text, but may use additional encoding methods specific to the format to encode features other than text. A file containing a document may be encoded according to a format appropriate to the document. A file may contain a word processing document, a spreadsheet document, a presentation document, a drawing document, a database document, a HyperText Markup Language (HTML) document, an Extensible Markup Language (XML) document, an image document, a text document, or any other document containing user data. When opening and editing a file, an application utilizes the file's format to decode the bits stored in memory and present the decoded information to a user.

In an example, the application 130 may be a browser extension, which is an application designed to supplement the functionality of a browser application. The application 130 contains a plurality of engines 135, each of which is configured to edit one or more file formats. A user of the user device 100 may provide input through the user input device 115 for the application 130 to open a file 125a. In an example, the input may be that the user drags and drops an icon of a file into a browser window. In another example, the user may open a file attached to an email accessed by using a browser to communicate with a web-based email service. In another example, the user may open a file attached to an email accessed using a desktop email application. In another example, the user may use a browser to navigate to a web-based collaborative document hosting service, and open a file hosted on the service. In another example, a user may interact with an application's user interface to open a file using the application. These examples are illustrative and a user may provide a different type of input to open a file without departing from the scope of the invention. Regardless of the form of the input, when the input is received, the application 130 may determine the format of the file 125a using one of several methods. In an example, the application 130 may determine the file format based on the filename extension of the file 125a. In another example, the application 130 may use header information of the file 125a to determine the format. In this example the application 130 may read a portion of the header information of the file 125a. The application 130 may then interpret the read portion of the header of the file 125a to determine the format of the file 125a. The application 130 may perform the determination based on a string indicating file type contained in the header. An example of a file type is a Multipurpose Internet Mail Extensions (MIME) type. Based on the determination of file format, the application 130 may select an engine 135a that is configured to edit the determined format of the file 125a. An engine that is configured to edit a format is configured to read data from memory and write data to memory, where the data is encoded according to the format. An engine configured to edit a format is not required to fully support the format; thus, the engine may be configured to read only a subset of a file encoded according to the format. Also, an engine configured to edit a format may be configured to write data using only a subset of the encoding methods of the format. The application 130 may then launch the selected engine 135a, which opens, displays, and allows editing of the file 125a.

When an engine 135a opens a document contained in a file 125a, the engine 135a decodes the data of the file 125a according to the native format of the file, and renders the document contained in the decoded data for display to a user. Rendering the document may comprise transforming data in the file 125a to a two-dimensional image for display on a user device 100 via a display 110. The user may view the rendered document and may provide user input to modify the document via user input device 115. Modification of a document may comprise one or more of text entry or deletion, text style changes, insertion of images and other media, and other document editing operations. The user may save the rendered document to the file 125a, for example, the engine 135a may save the document to the file 125a according to the native format of the file 125a. By saving in the native format, the engine 135a prevents loss of data due to format conversion. The engine 135a may automatically save the document to the file 125a at predetermined intervals without input from the user. Such automatic saving reduces loss of data due to malfunctioning of the user device 100 or the application 130. If the user device 100 or the application 130 malfunctions, the application 130 may provide a crash recovery dialog to the user via display 110. Such a crash recovery dialog may include a summary of the malfunction, a view of the most recent edited document at the page location just prior to the malfunction, and state information including previously open palettes and dialogs, allowing the user to indicate a course of action for reconciling any conflicts arising from the malfunction. By using the appropriate engine 135a to edit a file 125a, the application 130 provides document editing capability to a user, without loss of data due to conversion between formats.

The application 130 may provide file management capability to a user. When an engine 135a is launched and editing a document, the engine 135a may receive a user input to save the document to a different file in the database 120. In an example, the engine 135a may save the file in the same format as the original file 125a, but in a different file location, such as to file 125b. In another example, the engine 135a may receive a user input to rename the file 125a. In this example, the engine 135a will change the filename of file 125a. In this example, the contents of the file 125a may remain unchanged, or they may be updated to reflect updates in the document associated with the file 125a. In some examples, the application 130 receives a user input to rename the file 125a and changes the filename of the file 125a. In another example, the engine 135a may receive a user input to attach the modified file 125a to an email. In this example, the email to which the modified file 125a is attached may be a reply to another user who originally created the document. In this way, a receiving user can use the application 130 to open a document received in an email from a sending user, modify the received document, and send the modified document back to the sending user, even if the receiving user does not have the application used by the sending user to originally create the document. Alternatively, the email to which the modified file 125a is attached may not be a reply email, but may be an email such as a new email to a different user. In this example, the modified file 125a may be cached locally on the user device 100 and also on a server device 420. This file management capability may be combined with other capabilities described herein. By providing capabilities to rename and save new files, the application 130 allows a user to manage files on a user device 100.

The application 130 may provide file format conversion capability to a user. When an engine 135a is launched and editing a document, the engine 135a may receive a user input to save the document to a different format in the database 120. In an example, the engine 135a may save the file in a different format from that of the original file 125a, and to a different file location, such as to file 125b. This file format conversion capability may be combined with other capabilities described herein. By providing capabilities to save to a different format, the application 130 allows a user to convert a file from one format to another.

In some examples, multiple engines are chained to convert a file from one format to another. In these examples, the application 130 causes two or more of the engines 135 to convert files in sequence to reach the desired format. For example, the engine 135a may convert the file from the format of 125a to the format of 125b, and then another engine, such as 135b, may launch, open the file 125b and save the data therein to a different file 125c in a different format. This chaining may be repeated as many times as necessary to result in a file of the desired format.

The application 130 may provide file creation capability to a user. In an example, the application 130 may receive a user input to create a file, and upon receiving the input, present the user with one or more file formats. The presented file formats may be formats associated with the engines 135 of the application 130. The application 130 may receive a user selection of one of the presented file formats and launch an engine 135a associated with the selected file format. With the appropriate engine 135a launched, the user may then modify the document and save the document to a file 125a. A user may choose to create a file in a given format when generating a document to send to other users. In this situation, the user may choose a format which will be compatible with applications that the recipients may use to open and edit the file. This file creation capability may be combined with other capabilities described herein. In this manner, the application provides the user with the capability to create a file in a given format.

The application 130 may receive a request to open a file 125a that is designated as read-only. Such a read-only designation may indicate that the file 125a may be opened and viewed, but that the file 125a may not be modified. In an example, the application 130 may select the appropriate engine 135a as described herein, and the application 130 may launch the selected engine 135a in read-only mode. In read-only mode, the engine 135a may open and render the contents of the file 125a for display on display 110 but may prevent modifications of the file 125a. The engine 135a may allow a user to edit the rendered document as described herein, but may save the updated document to a different file 125b. The application 130 may create, open, natively edit, and save documents in different file locations and in different formats. This read-only capability may be combined with other capabilities described herein. By providing a plurality of engines 135, each of which engines are configured to edit one or more file formats, the application 130 can natively edit a plurality of file formats, as will be described herein.

Figure 2:
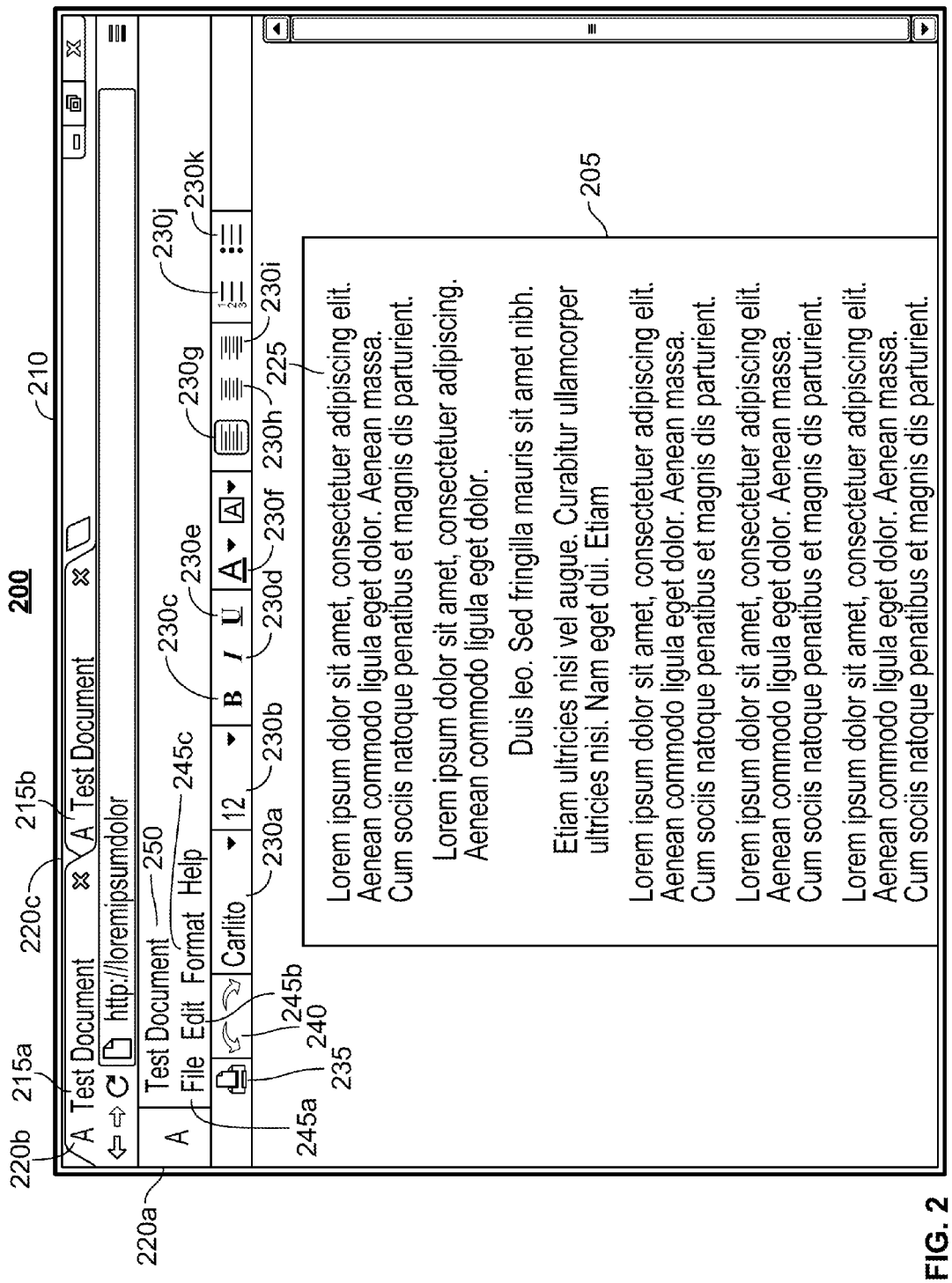
FIG. 2 depicts a user interface of an application running an engine configured to edit a word processing document, according to an illustrative implementation.

FIG. 2 illustrates an example of a user interface 200 of the application 130. In this example, the file 125a contains a word processing document 205, and the engine 135a is configured to edit the format of the file 125a. The user interface 200 may be provided in a browser 210. The browser 210 may have one or more tabs 215, allowing the selection of a document 205 to be displayed from a plurality of open documents or webpages. The interface 200 may include icons 220 to indicate the engine in use. The text 225 of the document 205 is displayed in the center of the user interface 200. In some examples, the text 225 is not in the center but rather in a different area of the of the user interface 200. In an example, some or all of the features associated with the text 225 may not be supported by the engine 135a. In this example, the unsupported features may not be displayed correctly, or may not be displayed at all. However, the engine 135a will preserve the unsupported features when saving the file 125a such that the features will still be available to another application or engine which may support the feature. In this example, the engine 135a will not allow editing of unsupported features to ensure that such features are preserved.

The user interface 200 contains tools 230 for editing features of the document 205. For example, the font in which the text 225 is displayed may be selected with tool 230a. The font size may be selected with tool 230b. The font style may be selected with tools 230c-e. The font color may be selected with tool 230f. The text alignment may be selected with tools 230g-i. Numbered lists may be created and edited with list tool 230j. Bulleted lists may be created and edited with list tool 230k. The document may be printed with print tool 235. Recent user changes made to the document may be reversed using undo tool 240. These and other tools may also be available in menus 245. The name of the document may be displayed in document title 250. The feature editing tools 230 displayed by the application 130 when using the engine 135a may be only those tools corresponding to features of the file format which the engine 135a supports. Thus, the application 130 may allow editing of fewer than all of the features contained in the file 125a. Another engine 135b may be configured to edit a different file format for a similar type of document. The application 130 may display a different set of tools in the user interface 210 when using the engine 135b than the application 130 displays when using the engine 135a. The user interface 200 is shown for illustrative purposes, but other configurations of the interface may provide similar functionality. By providing feature editing tools 230 to the user corresponding to the features of the file format which the engine 135a is configured to edit, the application 130 allows editing of only the features which the engine in use supports.

Figure 3:
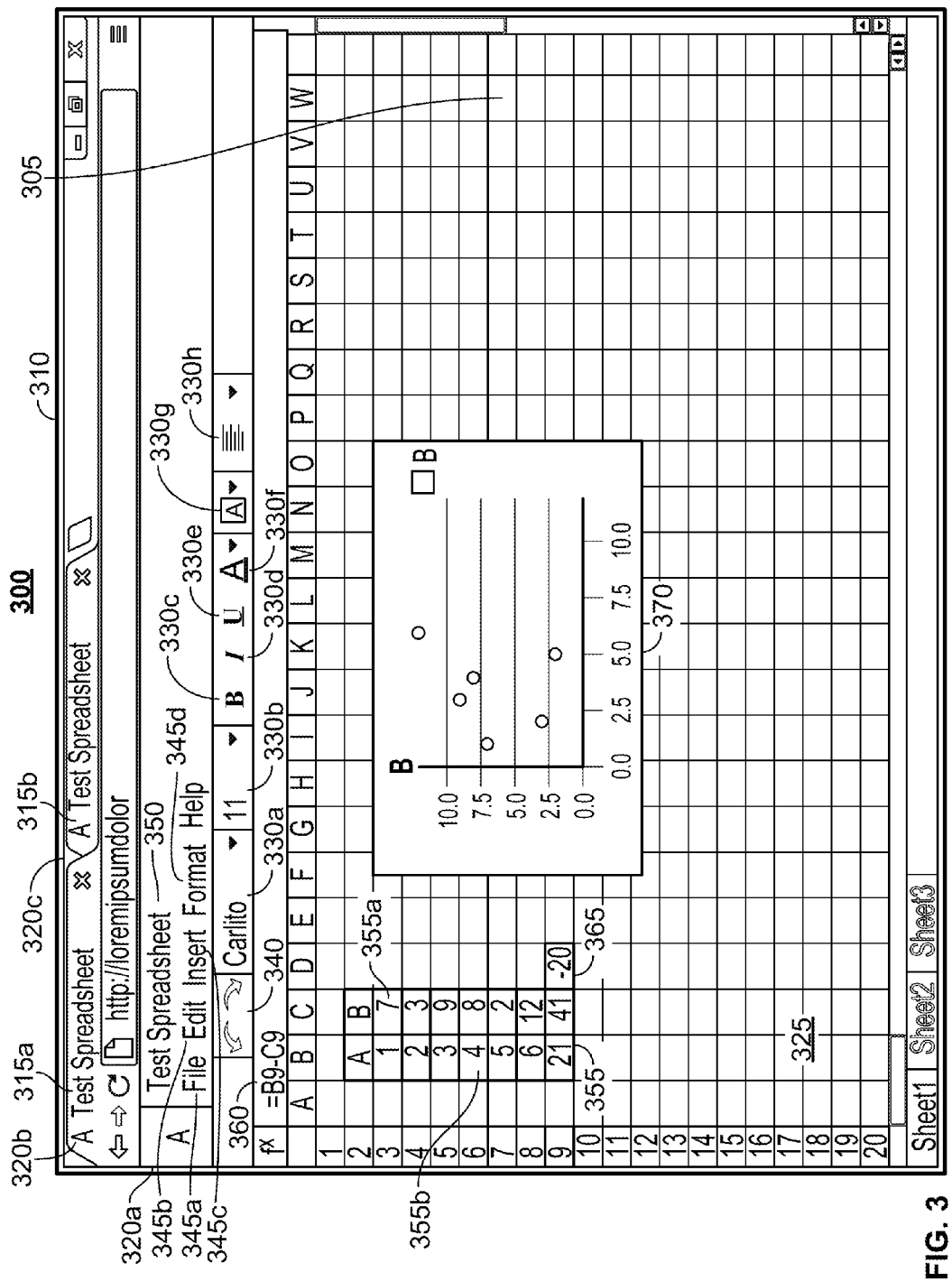
FIG. 3 depicts a user interface of an application running an engine configured to edit a spreadsheet document, according to an illustrative implementation.

FIG. 3 illustrates an example of a user interface 300 of the application 130. In this example, the file 125a contains a spreadsheet document 305, and the engine 135a is configured to edit the format of the file 125a. The user interface 300 may be provided in a browser 310. The browser 310 may have one or more tabs 315, allowing the selection of a spreadsheet 305 to be displayed from a plurality of open documents or webpages. The user interface 300 may include icons 320 to indicate the engine in use. The cells 325 of the spreadsheet 305 are displayed in the center of the user interface 300. Data may be contained in certain cells 355. The formula bar 360 may show a formula contained in a cell. For example, the selected cell 365 contains the formula "=B9−C9". Data in the spreadsheet 305 may be visualized with a chart 370. The chart 370 may contain references to data contained in cells 355. The chart 370 may be automatically updated using the references if data in the cells 355 is updated. In an example, some or all of the features associated with the chart 370 may not be supported by the engine 135a. In this example, the unsupported features may not be displayed correctly, or may not be displayed at all. However, the engine 135a will preserve the unsupported features when saving the file 125a such that the features will still be available to another application or engine which may support the feature. In this example, the engine 135a will not allow editing of unsupported features to ensure that such features are preserved.

The user interface 300 contains tools 330 for editing features of the spreadsheet 305. For example, the font in which the cell text 355a is displayed may be selected with tool 330a. The font size may be selected with tool 330b. The font style may be selected with tools 330c-e. The font color may be selected with tool 330f. The cell background color may be selected with tool 330g. The text alignment may be selected with tool 330h. Recent user changes made to the spreadsheet may be reversed using undo tool 340. These and other tools may also be available in menus 345. The feature editing tools 330 displayed by the application 130 when using the engine 135a may be only those tools corresponding to features of the file format which the engine 135a supports. Thus, the application 130 may allow editing of fewer than all of the features contained in the file 125a. Another engine 135b may be configured to edit a different file format for a similar type of document. The application 130 may display a different set of tools in the user interface 310 when using the engine 135b than the application 130 displays when using the engine 135a. The user interface 300 is shown for illustrative purposes, but other configurations of the interface may provide similar functionality. By providing feature editing tools 330 to the user corresponding to the features of the file format which the engine 135a is configured to edit, the application 130 allows editing of only the features which the engine in use supports.

Figure 4:
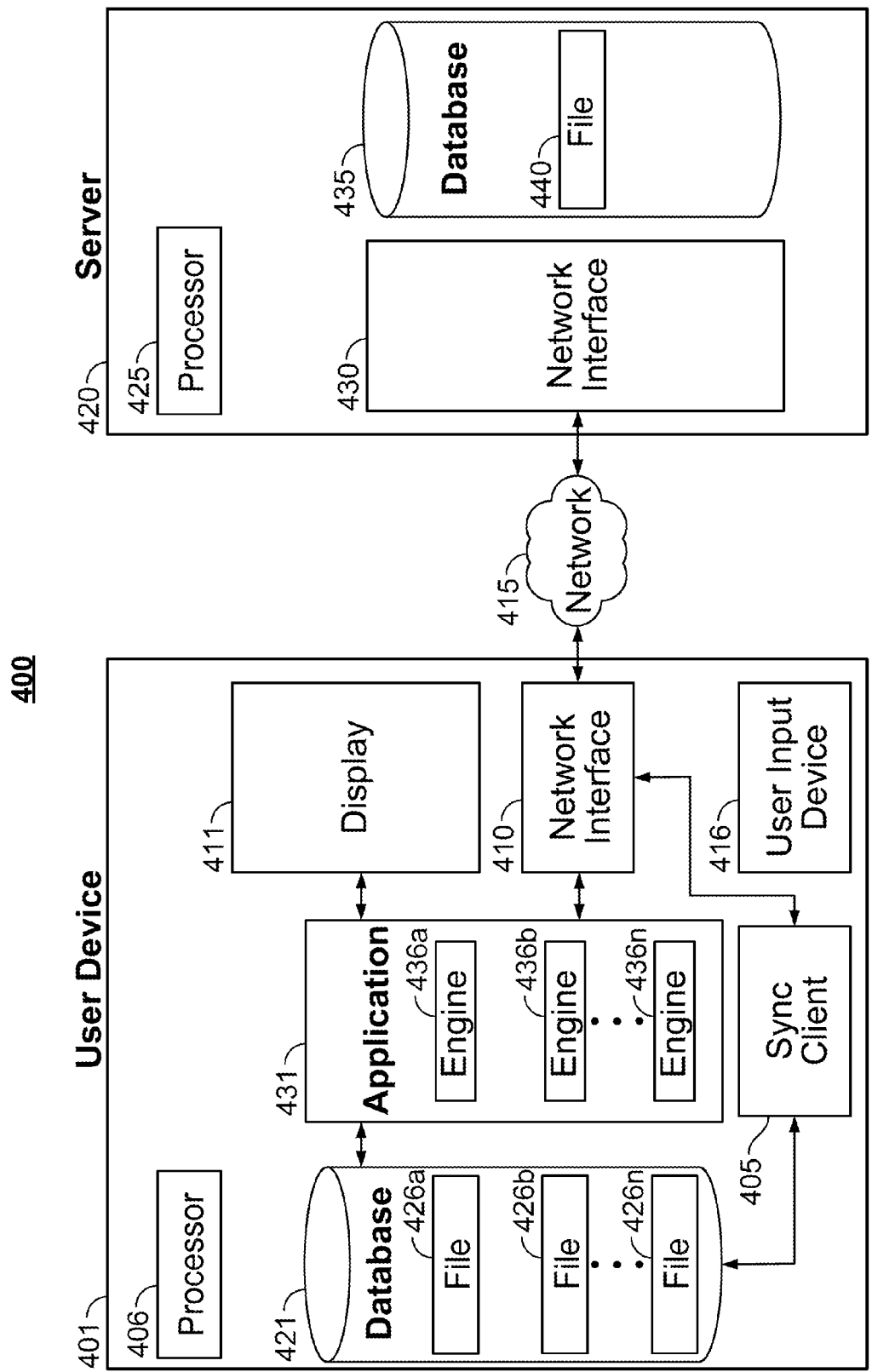
FIG. 4 is a block diagram of a user device in communication with a server via a network, according to an illustrative implementation.

The application 130 may support editing of types of documents other word processing documents, such as illustrated in FIG. 3, and spreadsheet documents, such as illustrated in FIG. 4. The application 130 may support editing of presentation documents, drawing documents, database documents, HTML documents, XML documents, image documents, text documents, or any other document containing user data. The application 130 may provide engines 135 configured to edit any or all of the file formats associated with such document types.

In an offline arrangement, an engine 135a may edit a document 125a without communication with devices other than the user device 100. In an online arrangement, an engine 135a may edit a document 125a while the user device 100 is in communication with other devices or a server. The application 130 and engines 135 may operate according to both the offline arrangement and the online arrangement. In an example of this, the application 130 may operate according to the offline arrangement when a network connection is unavailable, and may switch to the online arrangement when a network connection becomes available. The capability to switch between online and offline arrangements provides greater access to documents to users of mobile devices, for example.

FIG. 4 illustrates a system 400 which may enable a user device 401 to communicate with a server 420 via a network 415. The user device 401 may have a network interface 410 configured to act as an intermediary between the network 415 and the user device 401. The server 420 may have a network interface 430 configured to act as an intermediary between the network 415 and the server 420. A plurality of user devices similar to 401 may communicate with the server 420 in the same manner as user device 401 communicates with the server 420. For clarity, only one user device 401 is shown in FIG. 4. User devices 100 and 401 may perform similar functions and may have similar features. For example, the features 406, 41, 416, 421, 426a-n, 431, and 436a-n of user device 401 may perform similar functions as features 105, 110, 115, 120, 125a-n, 130, and 135a-n of user device 100.

In one implementation, the server 420 may act as a web-based storage system by hosting files and enabling users to store, retrieve, and modify data. The user may edit the file 440 located on the server 420. The application 431 may read and access the file 440 by communicating with the server 420 via the network 415 and the network interfaces 410 and 430. The application 431 may save the file 440 to a database 435 located on the server 420. To improve performance, such as in the presence of a slow or intermittent network connection 415, the application 431 may optionally maintain file 125a on the user device 401 as a local copy of file 440. In this way, if the network connection 415 is interrupted, causing the user device 401 to enter an offline state, the application 431 may continue to receive input from the user and to update the file 125a accordingly, and the application 431 may transmit such updates to the server 420 when the network connection 415 is re-established and the user device 401 returns to an online state. The system 400 may allow a user to use the application 431 to edit a file 440 located on the server 420.

In another implementation, the server 420 may act as an email server by transmitting emails and storing files attached to the transmitted emails. In another implementation, the server may act as both a web-based storage system and an email server as described herein.

In an arrangement, the system 400 may enable a file 426a stored on a user device 401 to be synchronized with a different file 440 stored on a server 420 via a network 415. The user device 401 may contain a sync client 405. The file 440 on the server 420 may be edited by another user, or by the same user on a different user device. In this situation, the remote file 440 may be modified, such as by another user. The server may transmit changes corresponding to the modified file 440 to the user device 401. The sync client may update the file 426a based on the transmitted changes. In this manner, the file 426a on the user device 401 may be synchronized with the remote file 440 on the server 420. In this arrangement, the application 431 may read and access the file 426a by communicating with the database 421. The application 431 may save changes to the file 426a to the database 421. The sync client 405 may detect changes made to the file 426a on the user device 401 and transmit the changes via the network 415 to the server 420. The sync client 405 may operate while the application 431 is editing the file 426a. Such operation may comprise either transmitting, to the server 420, local changes to the file 426a; receiving changes from the server 420 and updating the local file 426a; or both. This arrangement may be combined with other arrangements and implementations described herein. By synchronizing the file 426a on the user device 401 with the file 440 on the server 420, the user may edit a document on multiple devices and work collaboratively with other users.

In some examples, the application 431 may be located on the server 420 and communicate with the user device via the network 415. The application 431 may open and edit either a file 426a stored on the local device 401 or a file 440 stored on the server 420. The application 431 may use the server's processor 425 to render the contents of file 426a or file 440 for display on the user device 401 via display 411, and may transmit this rendering to the user device 401 via network 415. By using the network 415 to communicate between the server 420 and the user device 401, the system enables a user to edit a document regardless of whether the application 431 is installed on the user device 401.

Access control may be provided for either the file 426a, the file 440, or both. The server 420, or an application running thereon, may provide access control of a file 440 stored on the server 420. An application running on the user device 401, such as the sync client 405, may provide access control of a file 426a stored on the user device 401. Alternatively, the server 420, or an application running thereon, may provide access control of a file 426a stored on the local device 401 by communicating via the network 415. Access control of a file may comprise a requirement that a user authenticate prior to opening, editing, or saving the file. Access control of file 426a or file 440 may further comprise communication via the network 415 with a server other than server 420, such as an authentication server. A user may authenticate by inputting a user name and password (or providing other identification information) via a user interface, such that the same user device may be used by different users at different times. Users may be provided with varying levels of access to a file. For example, a user may have read-only access to a file, in which the user is allowed to open and view the file but is not allowed to edit or save the file. Alternatively, a user may have read-and-write access to a file, in which the user is allowed to open, edit, and save the file. A user may be designated as the owner of a file, and may grant other users access to the file. Users may be granted access on an individual basis, or groups of users may be granted access. An access control list associated with the file may determine the access rights of users attempting to access the file. By providing access control for files, the system enables enhanced security.

Figure 5:
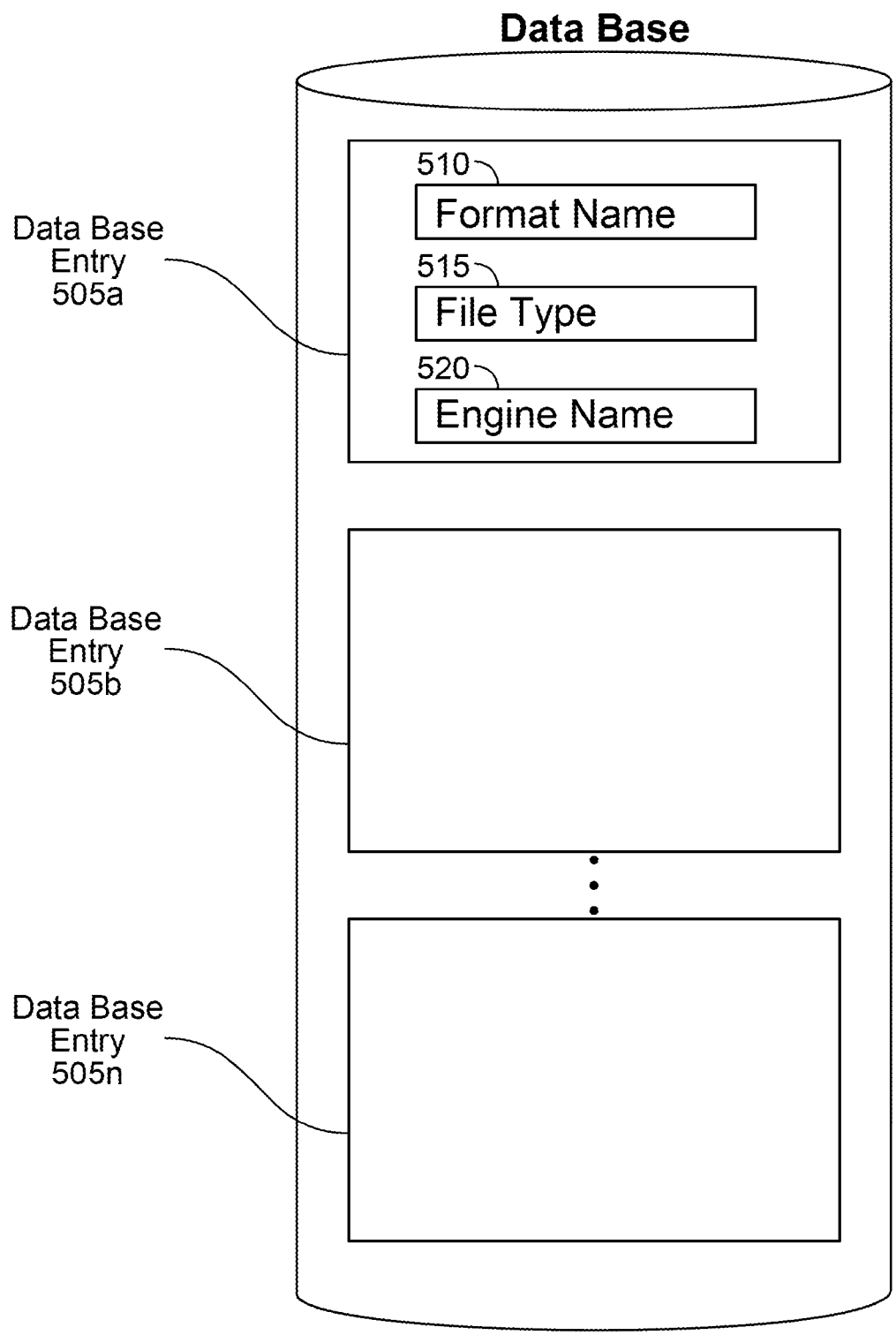
FIG. 5 is a block diagram of a database containing associations of engines with file formats, according to an illustrative implementation.

FIG. 5 illustrates a database 500 containing entries 505 which associate names of file formats 510 with names of engines 515 configured to edit the formats. The database 500 may be located on the user device 100 or on the server 420. An entry 505 may also contain one or more file types 515 associated with the format name 510. An example of a file type is a MIME type. An entry 505 may contain one format name 510 and multiple associated engine names 520. Alternatively, an entry 505 may contain multiple format names 510 and one associated engine name 520. Alternatively, an entry 505 may contain multiple format names 510 and multiple associated engine names 520. In an example, the database 500 may be queried by format name. In this example, the results of a query may include all entries containing the queried format name. In another example, the database 500 may be queried by file type. In this example, the results of a query may include all entries containing the queried file type. In a third example, the database 500 may be queried by engine name. In this example, the results of a query may include all entries containing the queried engine name. Thus, these entries 505 provide associations of file formats with editing engines. By associating file formats with editing engines, the database 500 enables the selection of an engine 135a configured to edit the format of a file 125a.

Figure 6:
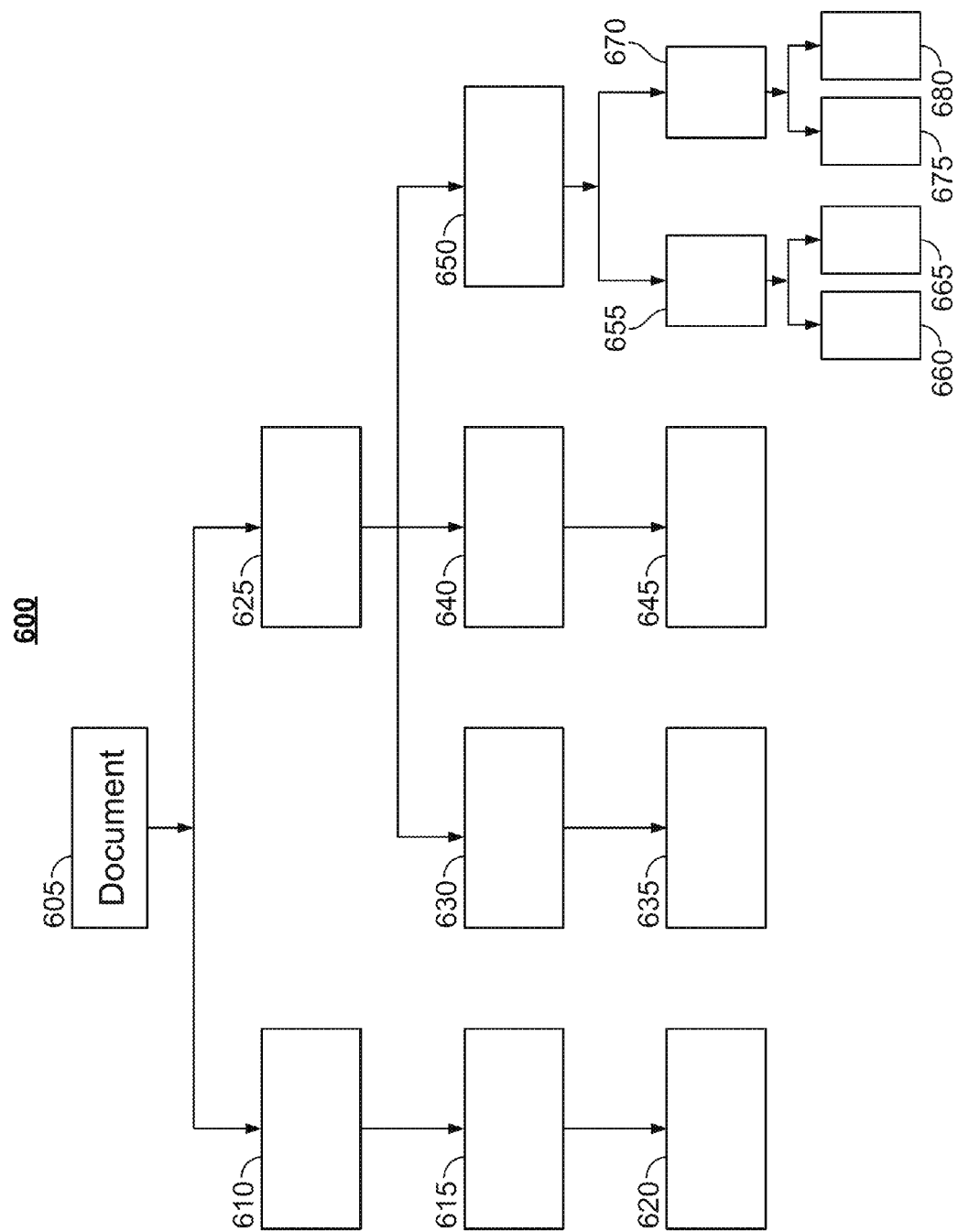
FIG. 6 is a block diagram of a document object model, according to an illustrative implementation.

FIG. 6 schematically illustrates a document object model (DOM) 600 used by an engine 135a when viewing or editing a document file. A document file may refer to a file containing a word processing document, a spreadsheet document, a presentation document, a drawing document, a database document, a HTML document, a XML document, an image document, a text document, or any other document file containing user data. In the DOM, objects of the document 605 are arranged as nodes in a hierarchy. An object may be a feature of the file. A node may have one or more nodes below it in the hierarchy, and a node may have one or more nodes above it in the hierarchy. For example, node 615 has node 620 below it and node 610 above it. Similar nodes may be at the same level in the hierarchy. For example, nodes 630, 640, and 650 may be at the same level in the hierarchy. In one example, a model-view-controller (MVC) implementation is used to create and edit the DOM 600, and to display the contents of the DOM 600 to a user. In this example, the model portion of the MVC parses a file and places sections of the file corresponding to objects of the document 605 into nodes of the DOM 600. For example, a paragraph may be placed into node 650 of the DOM, and a sentence in the paragraph may be placed in node 655. One word of the sentence may be placed into node 660, and another word may be placed into node 665. Another sentence of the paragraph may be placed into node 670, with its words placed in nodes 675 and 680. For clarity of illustration, only two sentence nodes and four word nodes are described above and in FIG. 6, but a paragraph may have any number of sentences and corresponding sentence nodes, and a sentence may have any number of words and corresponding word nodes. In another example, a table may be placed into the node 650 of the DOM 600, with table row elements placed in nodes 655 and 670. The contents of each cell in the table rows may be placed in nodes 660, 665, 675, and 680, respectively. Tables may have any number of rows and row nodes, and rows may have any number of cell nodes, but two row nodes and four cell nodes are described here for clarity of illustration. In another example, tables may be placed in to the DOM 660 with columns as the primary index. In this example, nodes 655 and 670 correspond to columns of the table, and nodes 660, 665, 675, and 680 correspond to contents of each cell in the table columns. In an example, node 610 may contain header information of the document. Node 615 may contain a sentence of the header, and node 620 may contain a word of the header sentence. For clarity of illustration, node 610 has only one subordinate node 615, which itself has only one subordinate node 620. Furthermore, as illustrated, the DOM 600 has four levels of hierarchy. However, any node in a DOM may have any number of subordinate nodes, and a DOM may have any number of levels of hierarchy.

After the model portion creates the DOM 600 and places contents into nodes, the view portion of a MVC may then traverse node-by-node through the DOM 600 and render some or all of the objects contained in the nodes of the DOM 600. The view portion may be a rendering engine, and may be a component of an engine 135a. As the view portion traverses through each node of the DOM 600, it will render the contents of the node if it is configured to do so. The view portion may use hard-coded logic to decode or parse the contents of each node as it encounters the node while traversing. If the hard-coded logic is configured to decode or parse the contents of the node, the view portion will render the contents of the node for display to a user. If the hard-coded logic is not configured to decode or parse the contents of the node, the view portion will not render the contents of the node and will traverse to another node. In an example, the view portion may traverse through the DOM 600 concurrently while the model portion is creating or updating the DOM 600.

The controller portion of a MVC may interact with the view portion and the model portion of the MVC to facilitate editing of the document 605 represented by the DOM 600. The controller portion may be a component of the engine 135a. When a user provides an editing input, the controller receives the input, determines the node of the DOM 600 to which the input corresponds, and updates the corresponding node. The controller then instructs the view portion of the MVC to render the updated node. The update to the DOM 600 must be validated for correctness. This validation may occur before or after the view portion renders the updated node. In an example, the controller may perform optimistic updating of the DOM 600. In this example, the controller portion sends the update directly to the view portion for immediate rendering, and asynchronously updates and validates the DOM 600. If the validation is successful, no further action is taken with regards to the update. If the validation is unsuccessful, the update to the DOM 600 is reversed, and the view portion renders the DOM 600 as it existed prior to the update. Such optimistic updating provides faster displaying of user edits.

In an example, the engine 135a may not be configured to edit all nodes of the DOM 600. In this example, a user may provide an input to edit a feature of the document 605 corresponding to a node of the DOM 600 which the engine 135a is configured to edit. This may occur even if the view portion of the MVC is configured to render the node. The controller portion of the MVC may receive the user input, and upon determining that the controller portion is not configured to edit the node, may not change the node. The engine 135a may optionally inform the user that the desired feature cannot be edited. In some examples, if the view portion is configured to render the node but the engine 135a is not configured to edit the node, the view portion may render the node's contents incorrectly. However, because the controller portion does not edit such nodes, the original contents of these nodes are preserved. In this manner, a subsequent application or engine which fully supports the feature contained in these nodes may render and edit the original unmodified contents of the nodes without loss of data.

When the document 605 is saved, the engine 135a may use the DOM hierarchy 600 to save according to the document 605's format. In an example, the nodes of the DOM 600 may contain data already encoded in the format of the file originally containing the document 605. In this example, the data contained in the nodes of the DOM 600 is not modified or converted to a different format before saving. In another example, the engine 135a may encode supported features, and their corresponding nodes of the DOM 600, according to the document 605's format. In this example, nodes of the DOM 600 having features which the engine 135a is not configured to render, or to edit, contain data encoded according to the file's original format and are not further encoded prior to saving. If nodes which the engine 135a is not configured to render or to edit were reformatted, some or all of the data in the nodes would be lost due to the fact that the engine 135a is not configured to properly decode the nodes' format. Furthermore, if these nodes were simply discarded upon saving, the nodes' data would also be lost. By preserving the format of nodes having features which the engine 135a is not configured to render, or to edit, unsupported features of the original file are preserved while other features are edited.

Figure 7:
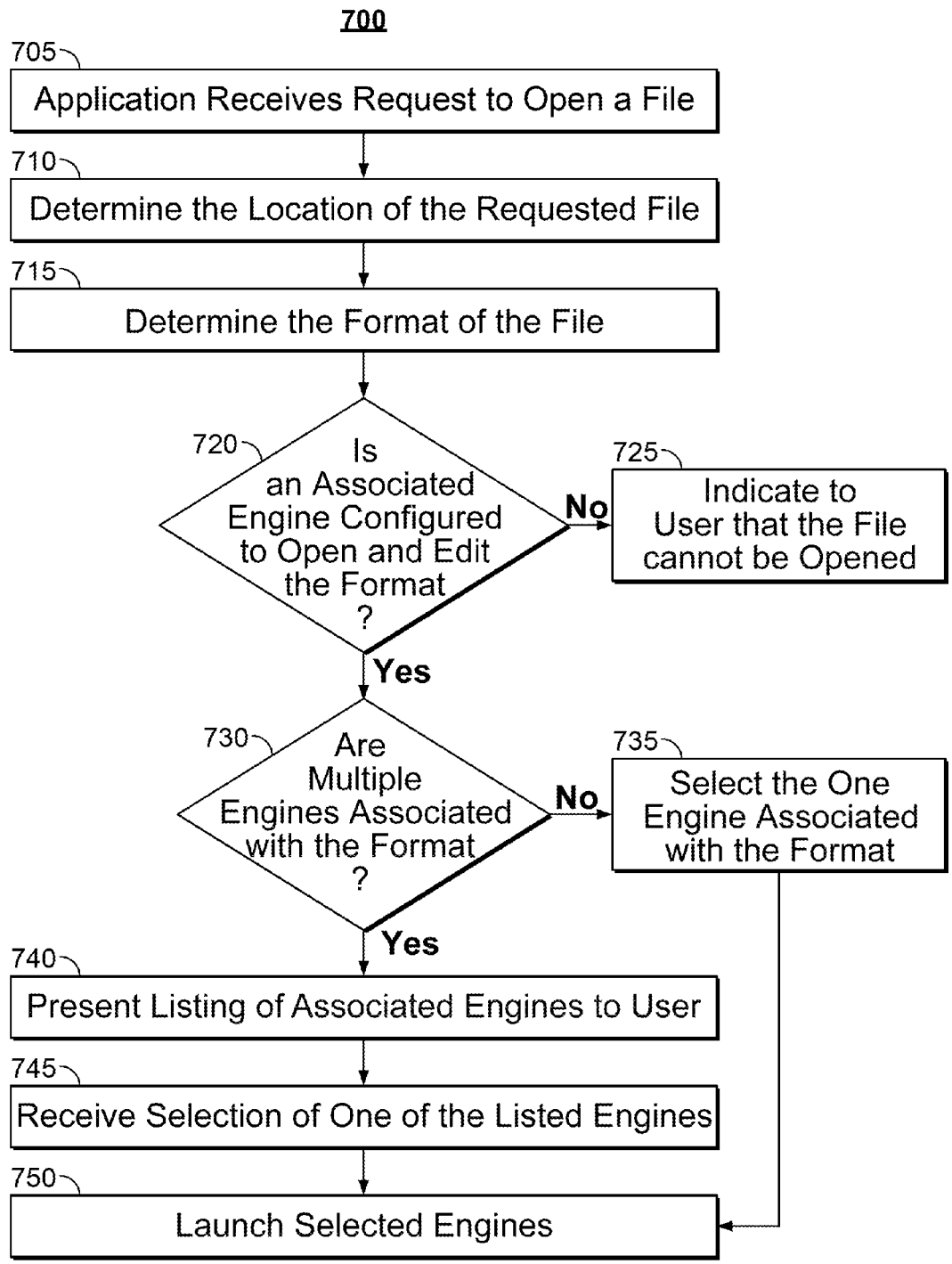
FIG. 7 is a flow chart of a method by which an application launches an engine configured to edit the format of a requested file, according to an illustrative implementation.

FIG. 7 illustrates a flowchart 700 of a method for selecting an engine to launch when opening a requested file. A user may enter a request at a client device to open a file having a particular file type. The request is received by an application, such as application 130, which occurs, for example, at step 705. The request may contain a file identifier associated with the file to be opened. In step 710, a processor running the application 130 determines the location of the requested file, based on information contained in the request. The requested file may be located on the user device 100, on a server 420, or in another location. The location may be determined by checking a file index in a database or memory. In step 715, the application determines the format of the requested file. The application may determine the format based on a filename extension, header information, or other information associated with the file. If the filename extension is used to determine the format, the application may use the filename extension of either the requested file, the located file, or both. If header information is used to determine the format, the application may read a portion of the located file's header and extract a string indicating file type from the header. The file type string may be a MIME type string. In some examples, both header information and file extension information may be used to determine a file's format. If both determinations provide similar indications of the file's format, the likelihood is increased that the determinations are correct. However, if the determinations provide different indications of format, a conflict exists. Such a conflict may occur if a file extension has been changed by a user to a different file extension.

At decision block 720, the application 130 queries a database 500 to determine if an engine configured to open and edit the file is associated with the application. The application 130 determines if any entries in the database 500 contain the format of the located file. If no entries in the database contain the format of the located file, the method proceeds to step 725 and presents a message to the user that the requested file cannot be opened. Furthermore, if a conflict exists between multiple determinations of format, as described above, the method may proceed to step 725, and as part of step 725, may inform the user of the conflict in determination of format. Alternatively, in the event of such a conflict, the method may proceed directly to step 740 and prompt the user to select an engine directly. This prompt may include a listing of some or all of the engines 135. Following step 725, the method 700 terminates. If one or more entries in the database 500 contain the format of the located file, the method proceeds to decision block 730.

At decision block 730, the application 130 determines whether multiple engines are associated with the format of the located file. The database 500 contains one or more entries 505 which provide associations of engines with file formats. An entry 505 may contain one format name 510 and multiple associated engine names 520. Alternatively, an entry 505 may contain multiple format names 510 and one associated engine name 520. Alternatively, an entry 505 may contain multiple format names 510 and multiple associated engine names 520. If the application 130 determines by querying the database that only one engine is associated with the format of the located file, the method proceeds to step 735, where the one engine associated with the format of the located file is selected. If the application determines by querying the database that a plurality of engines are associated with the format of the located file, the method proceeds to step 740.

In step 740, the application 130 presents a listing of the plurality of associated engines to the user, via a display device 110 on the user device 100. In step 745, the application 130 receives a selection of one of the plurality of associated engines from the user, via a user input device 115. In step 750, the application 130 launches the selected engine which can be used to edit the requested file.

Figure 8A:
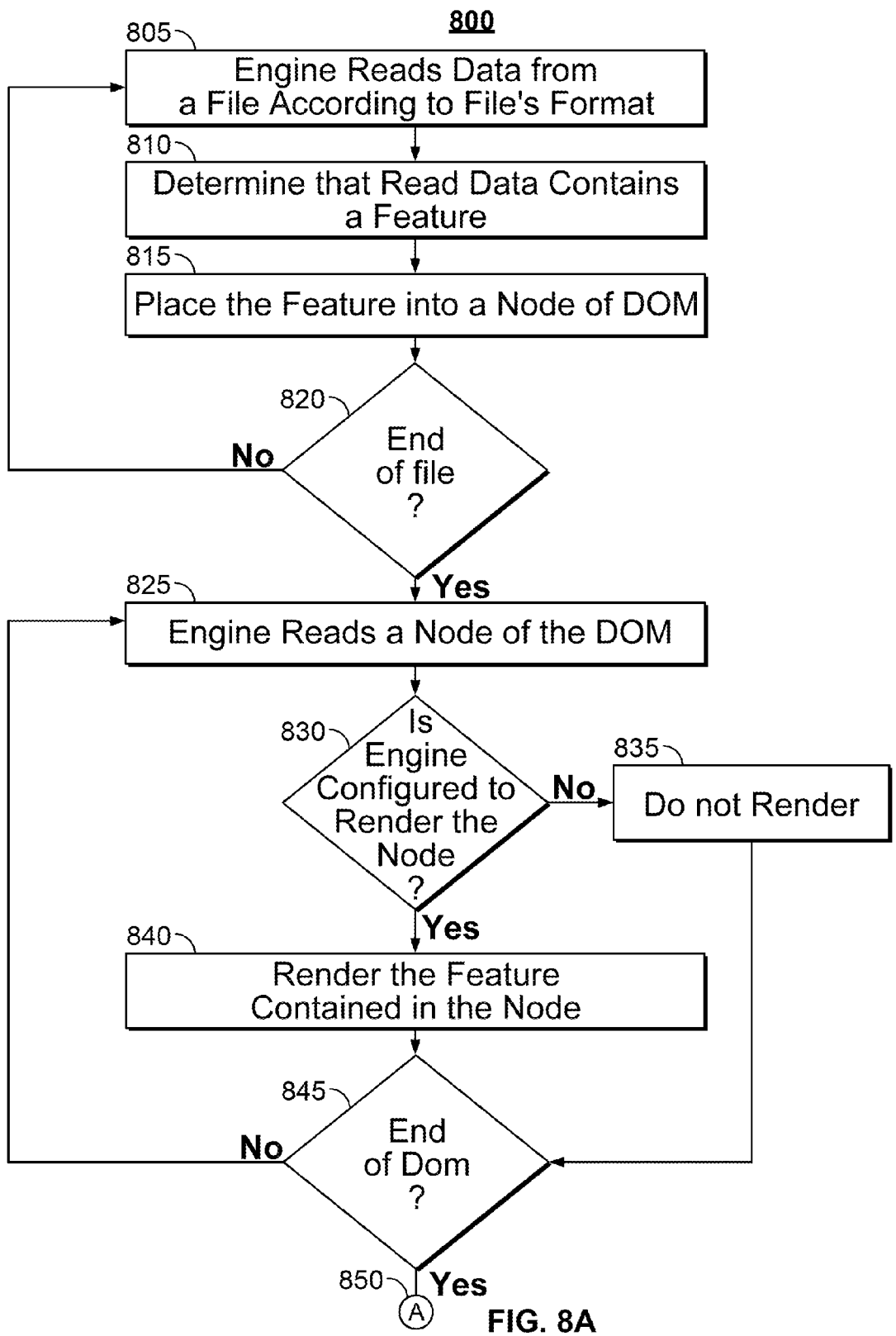
FIGS. 8A-8B depict a flow chart of a method by which an engine reads data from a file, places data into nodes of a document object model, and processes edits made to the document, according to an illustrative implementation.
Figure 8B:
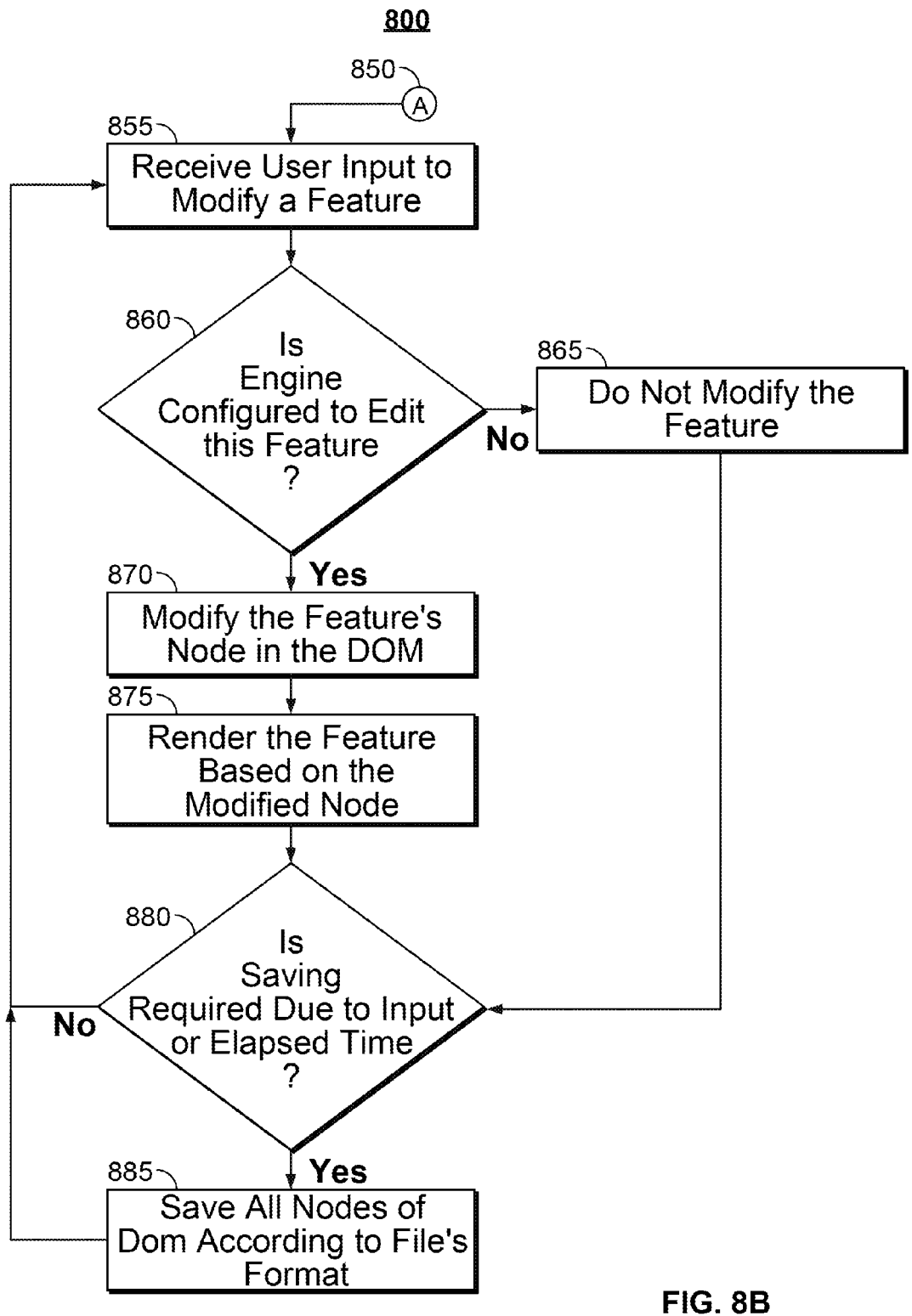

FIGS. 8A-8B illustrate a flowchart 800 of a method for using an engine 135a to load and edit a feature of a file 125a. When a user requests to open a file and an engine has been identified, for example, using the steps in flowchart 700, the file data may be processed using the steps of flowchart 800. The application 130 may launch the selected engine 135a upon receiving a user input from a browser, such as the browser 210. The engine 135a may display the document, via the browser 210, in a user interface such as the user interface 200. Beginning at FIG. 8A, in step 805, the engine 135a reads data from the file 125a according to the format of the file. In step 810, a processor running the engine 135a, such as the processor 105, determines that the read data contains a feature. In step 815, the engine 135a places the feature into a node of a DOM, such as DOM 600, associated with the file 125a. At step 820, the engine 135a determines whether the end of the file 125a has been reached. If the end of the file 125a has not been reached, the method returns to step 805 to continue reading additional data from the file 125a. If the end of the file 125a has been reached, the method proceeds to step 825. The model portion of the engine 135a may perform one or more of steps 805, 810, 815, and 820.

At step 825, the engine 135a reads a node of the DOM 600 while traversing through the DOM 600. At decision block 830, the engine 135a determines whether it is configured to render the node, or the file feature contained in the node. An engine that is configured to render a feature of a file is configured to read data from memory associated with the feature, wherein the data is encoded according to the format of the file. In some examples, the engine 135a makes this determination based on information that is explicitly hard-coded into the engine 135a. If the engine 135a determines that it is not configured to render the feature, the method proceeds to step 835, where the engine 135a does not render the feature and then proceeds to decision block 845. If the engine 135a determines that it can render the feature, the method proceeds to step 840. At step 840, the engine 135a renders the feature contained in the node. The method then proceeds to decision block 845, where the engine 135a determines whether the end of the DOM 600 has been reached. The engine 135a may make this determination by determining whether all nodes of the DOM have been traversed. If the end of the DOM has not been reached, the method returns to step 825, where the engine 135a continues traversing through the DOM 600. If the end of the DOM has been reached, the method proceeds to step 855. The view portion of the engine 135a may perform one or more of steps 825, 830, 835, 840, and 845.

Turning to FIG. 8B, at step 855, the engine 135a receives user input to modify a feature of the document represented by DOM 600. The user may provide this input via a graphical user interface, such as the interfaces 200 and 300. For example, if the feature is a paragraph, the input may comprise an addition to the text of the paragraph. As another example, the input may comprise style change instructions such as to change the paragraph font style to boldface. These examples are not limiting and the user input may be any user input which modifies the feature. At decision block 860, the engine 135a determines whether is configured to edit the feature. An engine that is configured to edit a feature of a file is configured to read data from memory and write data to memory, wherein the data is associated with the feature and encoded according to the format of the file. In an example, the engine 135a makes this determination by decoding the contents of the node of the DOM corresponding to the feature to be edited. In this example, if the engine 135a can successfully decode the contents of the node, the engine 135a will determine that it can edit the feature and will determine that it cannot edit the feature if it cannot decode the contents of the node. If the engine 135a determines that it is not configured to edit the feature, the method proceeds to step 865, where the engine 135a does not modify the feature and proceeds directly to step 880. If the engine 135a determines that it is configured to edit the feature, the method proceeds to step 870. At step 870, the engine 135a modifies the node in the DOM 600 which corresponds to the feature. The engine 135a may validate the DOM 600 after modifying the node. At step 875, the engine 135a renders the feature based on the contents of the modified node. In an example of optimistic updating, steps 870 and 875 may occur concurrently or asynchronously. In this example, the controller portion of the engine 135a may directly send updates to the view portion, and later update and validate the DOM 600.

At decision block 880, the engine 135a determines whether saving is required. Saving is required if user provides an input to save the document, or if an elapsed time has exceeded a predetermined threshold. If the engine 135a determines that saving is required, the method proceeds to step 885, where the engine 135a saves the data contained in the DOM 600 to a file, according to the format of the located file 125a. For nodes of the DOM 600 which the engine 135a is not configured to edit, the engine 135a saves data contained in these nodes unchanged from the data's original state. Data contained in nodes of the DOM 600 which the engine 135a is configured to edit may be modified from its original state, and the engine 135a saves this data according to the original format of the located file 125a. At step 880, the engine 135a may save all nodes in the DOM 600 to a file, or it may only save a portion of nodes, such as the nodes that were updated. At step 880, the engine 135a may alternatively save the data contained in the DOM 600 to a format different than that of the file 125a's original format. The selection of format may be determined based on a user selection via user input device 115. If, at decision block 880, the engine 135a determines that saving is not required, the method 800 proceeds to step 855, where the engine 135a receives another user input. After saving at step 885, the method returns to step 855, where the engine 135a receives another user input. The method 800 may loop in this manner until interrupted by the user. The user may interrupt the method 800 by closing the document via a user interface, or by simply closing a user interface. In an example, the controller portion of the engine 135a may perform steps 855, 860, 865, 870, 880, and 885. In this example, the view portion of the engine 135a may perform step 875. By preserving unsupported features in nodes of the DOM 600, and preventing modifications to those nodes, the unsupported features of the file are preserved by the engine 135a when the DOM 600 is saved.

Figure 9:
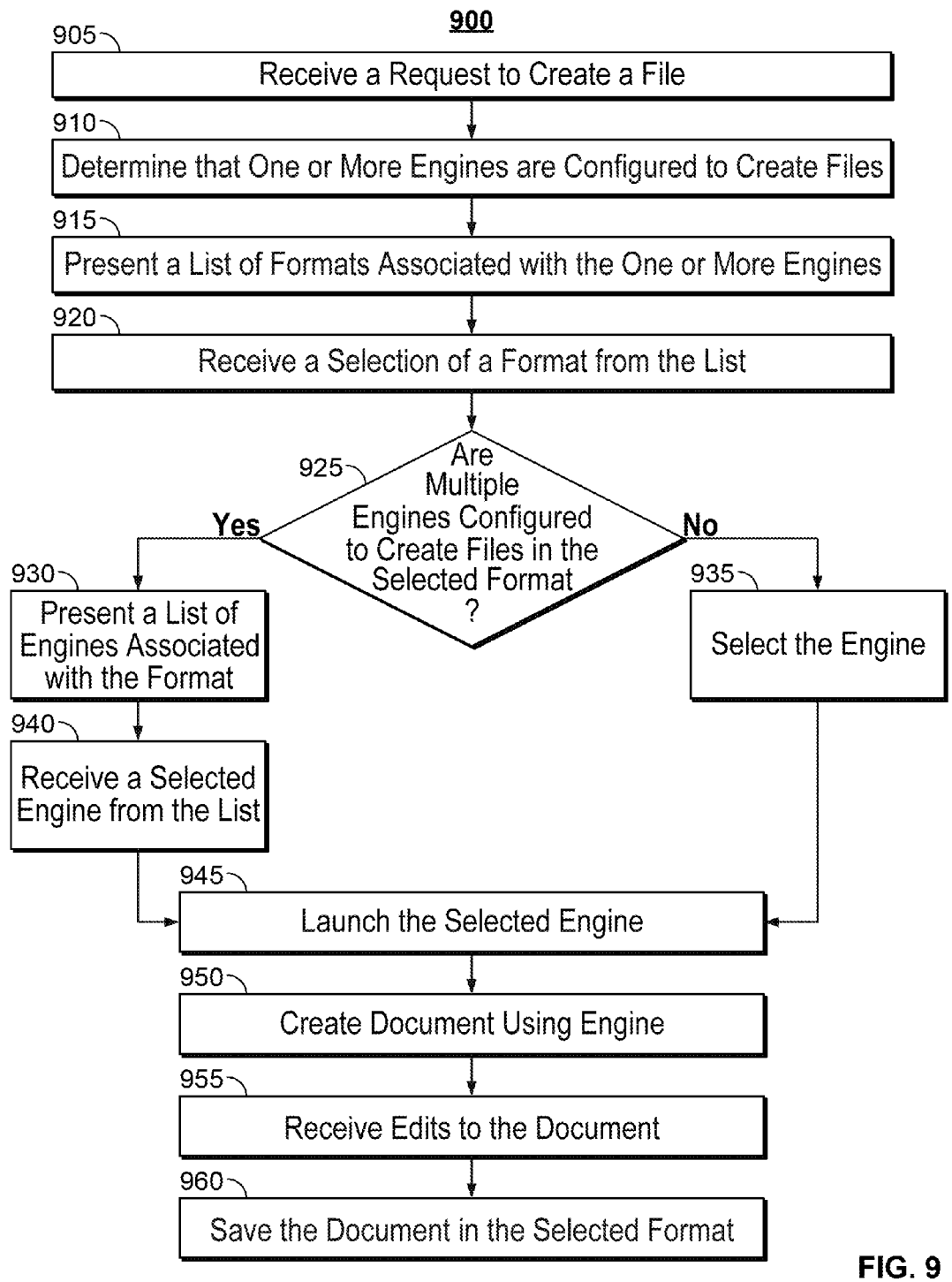
FIG. 9 is a flow chart of a method by which an engine creates a file in a format specified by a user, according to an illustrative implementation.

FIG. 9 illustrates a flow chart 900 of a method used by an application 130 to create a file. A user may provide an input, via a user interface such as the user interface 200, to create a file with a specific file format. In step 905, a processor running the application 130 receives a request from a user to create a file. At step 910, the processor determines that one or more of the engines 135 are configured to create a file. This determination may be made by querying a database such as database 500. At step 915, the application 130 presents a list to the user of formats associated with the one or more engines configured to create a file. At step 920, the application 130 receives, from the user, a selection of a format from the presented list. At decision block 925, the application 130 determines whether multiple engines are configured to create documents in the selected format. The application 130 may query a database 500 to determine if one or more engines configured to create files in the selected format are associated with the application. If only one engine is configured to create documents in the selected format, the method proceeds to step 935, where the one engine is selected. If multiple engines are configured to create documents in the selected format, the method proceeds to step 930, where the application 130 presents a list of engines associated with the selected format to the user. At step 940, the application 130 receives a selection of an engine 135a from the presented list of engines. At step 945, the application 130 launches the selected engine 135a. At step 950, launched engine 135a creates a document in the selected format and renders the document for display to the user via display 110. At step 955, the launched engine 135a receives, from the user, edits to the rendered document. These edits may be received according to steps of the method 800. At step 960, the launched engine 135a saves the document to a file 125a according to the selected format. In some implementations, the method 900 may be simplified. In these implementations, the application 130 may present a list of engines to the user at step 915, receive a selection of engine at step 920, and proceed directly to step 945, where the application 130 opens the selected engine. In some implementations, the engine 135a can open or copy a blank template file instead of creating a new instance of a file.

Figure 10:
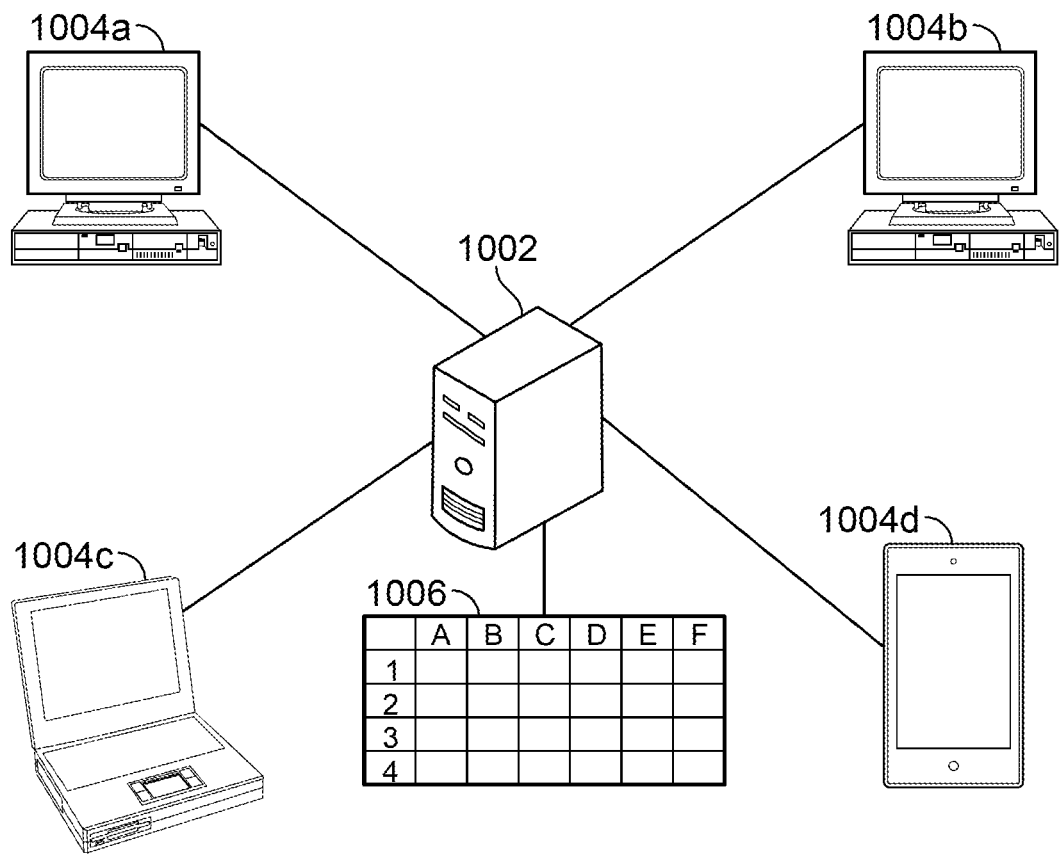
FIG. 10 is a block diagram of a cloud computing service, according to an illustrative implementation.

FIG. 10 shows a client-server system 1000 that includes cloud computing service 1002 and a number of client computers 1004a through 1004d. Cloud computing service 1002 may include one or more servers that collectively provide cloud computing services for a multitude of client computers. Cloud computing service 1002 stores a number of files accessible by client computers 1004a-1004d, including an exemplary collaborative spreadsheet 1006. Users may create, edit, copy, share, and delete files stored on cloud computing service 1002. For example, client computers 1004a-1004d may simultaneously access spreadsheet 1006 on cloud computing service 1002 using a web browser. Cloud computing service 1002 provides each client computer with a local copy of spreadsheet 1006, which users on the client computers may view and edit. Edits, otherwise termed mutations, made by client computer 1004a are automatically sent to cloud computing service 1002 and transmitted to the other client computers 1004b-1004d. Thus mutations made by one collaborator are immediately seen by other collaborators.

Client computers 1004a-1004d may include desktop computers, laptop computers, tablets, smart phones, mobile electronic devices, or any other device that may connect to cloud computing service 1002 through a remote network. System 1000 may include many client computers that connect with cloud computing service 1002. Cloud computing service 1002 and client computers 1004a-1004d of system 1000 are connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 11:
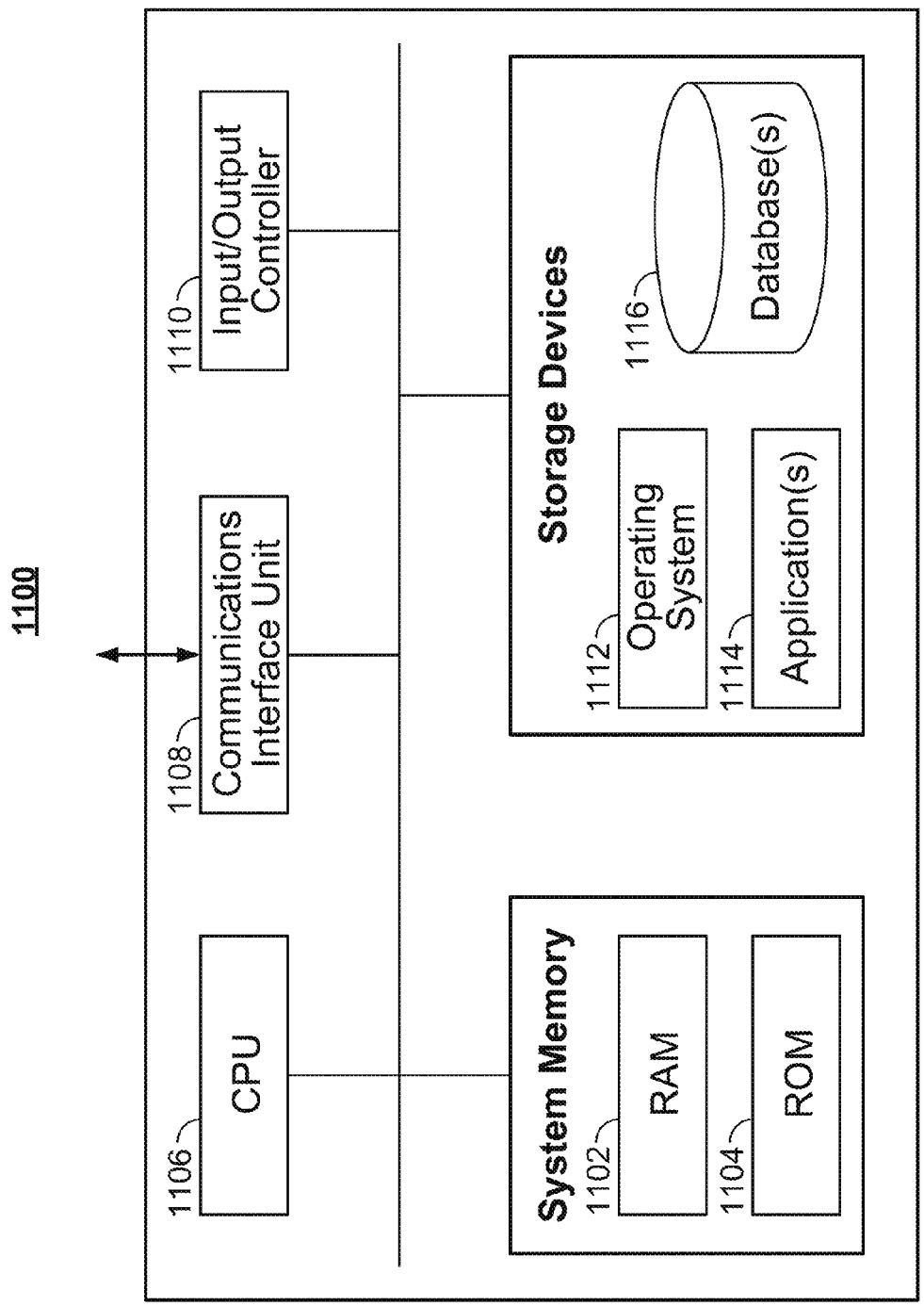
FIG. 11 is a block diagram of a computing device for performing any of the processes described herein, according to an illustrative implementation.

FIG. 11 is a block diagram of a computing device, such as any of the components of the systems of FIGS. 1-10, for performing any of the processes described herein. Each of the components of these systems may be implemented on one or more computing devices 1100. In certain aspects, a plurality of the components of these systems may be included within one computing device 1100. In certain implementations, a component and a storage device may be implemented across several computing devices 1100.

The computing device 1100 includes at least one communications interface unit, an input/output controller 1110, system memory, and one or more data storage devices. The system memory includes at least one random access memory (RAM 1102) and at least one read-only memory (ROM 1104). All of these elements are in communication with a central processing unit (CPU 1106) to facilitate the operation of the computing device 1100. The computing device 1100 may be configured in many different ways. For example, the computing device 1100 may be a conventional standalone computer or alternatively, the functions of computing device 1100 may be distributed across multiple computer systems and architectures. Alternatively, a computer system may be virtualized to provide the functions of multiple computing devices 1100. In FIG. 11, the computing device 1100 is linked, via network or local network, to other servers or systems.

The computing device 1100 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1108 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1106 includes a processor, such as one or more conventional microprocessors and one or more supplementary co-processors such as math co-processors for offloading workload from the CPU 1106. The CPU 1106 is in communication with the communications interface unit 1108 and the input/output controller 1110, through which the CPU 1106 communicates with other devices such as other servers, user terminals, or devices. The communications interface unit 1108 and the input/output controller 1110 may include multiple communication channels for simultaneous communication with, for example, other processors, servers or client terminals.

The CPU 1106 is also in communication with the data storage device. The data storage device may include an appropriate combination of magnetic, optical or semiconductor memory, and may include, for example, RAM 1102, ROM 1104, flash drive, an optical disc such as a compact disc or a hard disk or drive. The CPU 1106 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1106 may be connected to the data storage device via the communications interface unit 1108. The CPU 1106 may be configured to perform one or more particular processing functions.

The data storage device may store, for example, (i) an operating system 1112 for the computing device 1100; (ii) one or more applications 1114 (e.g., computer program code or a computer program product) adapted to direct the CPU 1106 in accordance with the systems and methods described here, and particularly in accordance with the processes described in detail with regard to the CPU 1106; or (iii) database(s) 1116 adapted to store information that may be utilized to store information required by the program.

The operating system 1112 and applications 1114 may be stored, for example, in a compressed, an uncompiled and an encrypted format, and may include computer program code. The instructions of the program may be read into a main memory of the processor from a computer-readable medium other than the data storage device, such as from the ROM 1104 or from the RAM 1102. While execution of sequences of instructions in the program causes the CPU 1106 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1112, a database management system and "device drivers" that allow the processor to interface with computer peripheral devices (e.g., a video display, a keyboard, a computer mouse, etc.) via the input/output controller 1110.

The term "computer-readable medium" as used herein refers to any non-transitory medium that provides or participates in providing instructions to the processor of the computing device 1100 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1106 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1100 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A computer-implemented method for editing documents in a native format, the method comprising:
   receiving, at a processor running a first application, a request from a user to open a file created using a second application in a first format;
   determining the first format of the file;
   selecting an engine from a plurality of engines associated with the first application, wherein the selected engine is configured to edit the first format;
   opening the file using the selected engine in the first application without converting the format of the file to a second format associated with the first application;
   rendering, by the selected engine in the first application, contents of the file for display on a user device to the user;
   determining that the selected engine is configured to edit a feature of the file;
   rendering, by the selected engine in the first application, the feature for display on a user device to the user;
   processing, using the selected engine in the first application, an edit to the rendered feature in the first format; and
   saving, to the database, the edited feature to the file using the first application in the first format;
   wherein:
   the first format is a native format of the second application, and
   the first format is a non-native format for the first application.

2. The method of claim 1, the method further comprising presenting, to the user, a user interface comprising feature editing tools of the selected engine.

3. The method of claim 1, the method further comprising:
   determining that the selected engine is not configured to edit a second feature of the file;
   rendering, by the selected engine in the first application, the second feature for display on a user device to the user;
   preventing modification of the second feature by the user;
   determining that the selected engine is configured to edit a third feature of the file;
   rendering, by the selected engine in the first application, the third feature for display on a user device to the user;
   processing, using the selected engine in the first application, an edit to the third feature in the first format; and
   saving, to the database, the edited third feature to the file using the first application in the first format.

4. The method of claim 3, the method further comprising:
   placing, by the selected engine, data corresponding to the second feature into a node of a document object model;
   associating, with the node, the characteristic that the selected engine is not configured to edit the second feature; and
   saving, to the database, the placed data to the file using the first application in the first format.

5. The method of claim 1, the method further comprising:
   determining that the selected engine is not configured to render a second feature of the file;
   placing data corresponding to the second feature into a node of a document object model; and
   associating, with the node, the characteristic that the selected engine is not configured to render the second feature;
   saving, to the database, the placed data to the file using the first application in the first format.

6. The method of claim 1, wherein the file is stored on a server remote from the user.

7. The method of claim 1, wherein the selecting further comprises:
   locating the first format in a second database;
   determining that an engine is associated with the first format; and
   selecting the associated engine.

8. The method of claim 7, further comprising:
   determining that a plurality of engines are associated with the file format;
   presenting a plurality of names to the user, each name corresponding to one of the plurality of engines;
   receiving, from the user, a selected name from the plurality of names; and
   selecting the engine associated with the selected name.

9. The method of claim 1, wherein the determining further comprises:
   reading a portion of the file;
   extracting a file type from the read portion; and
   determining the first format of the file based on the extracted file type.

10. The method of claim 1, wherein the saving comprises saving the file in a third format.

11. A system for editing documents in a native format, comprising a processor that:
    receives, while running a first application, a request from a user to open a file created using a second application in a first format;
    determines the first format of the file;
    selects an engine from a plurality of engines associated with the first application, wherein the selected engine is configured to edit the first format;
    opens the file using the selected engine in the first application without converting the format of the file to a second format associated with the first application;
    renders, using the selected engine in the first application, contents of the file for display on a user device to the user;

determines that the selected engine is configured to edit a feature of the file;

renders, using the selected engine in the first application, the feature for display on a user device to the user;

processes, using the selected engine in the first application, an edit to the rendered feature in the first format; and saves, to the database, the edited feature to the file using the first application in the first format;

wherein:

the first format is a native format of the second application, and the first format is a non-native format for the first application.

12. The system of claim 11, wherein the processor presents, to the user, a user interface comprising feature editing tools of the selected engine.

13. The system of claim 11, wherein the processor:

determines that the selected engine is not configured to edit a second feature of the file;

renders, using the selected engine in the first application, the second feature for display on a user device to the user;

prevents modification of the second feature by the user;

determines that the selected engine is configured to edit a third feature of the file;

renders, using the selected engine in the first application, the third feature for display on a user device to the user;

processes, using the selected engine in the first application, an edit to the third feature in the first format; and saves, to the database, the edited third feature to the file using the first application in the first format.

14. The system of claim 13, wherein the processor:

places, using the selected engine, data corresponding to the third feature into a node of a document object model;

associates, with the node, the characteristic that the selected engine is not configured to edit the third feature; and saves, to the database, the placed data to the file using the first application in the first format.

15. The system of claim 11, wherein the processor:

determines that the selected engine is not configured to render a second feature of the file;

places data corresponding to the second feature into a node of a document object model; and associates, with the node, the characteristic that the selected engine is not configured to render the second feature;

saves, to the database, the placed data to the file using the first application in the first format.

16. The system of claim 11, wherein the file is stored on a server remote from the user.

17. The system of claim 11, wherein the processor:

locates the first format in a second database;

determines that an engine is associated with the first format; and selects the associated engine.

18. The system of claim 17, wherein the processor:

determines that a plurality of engines are associated with the file format; presents a plurality of names to the user, each name corresponding to one of the plurality of engines;

receives, from the user, a selected name from the plurality of names; and selects the engine associated with the selected name.

19. The system of claim 11, wherein the processor:

reads a portion of the file;

extracts a file type from the read portion; and determines the first format of the file based on the extracted file type.

20. The system of claim 11, wherein the processor saves the file in a third format.

* * * * *